Figure 1:
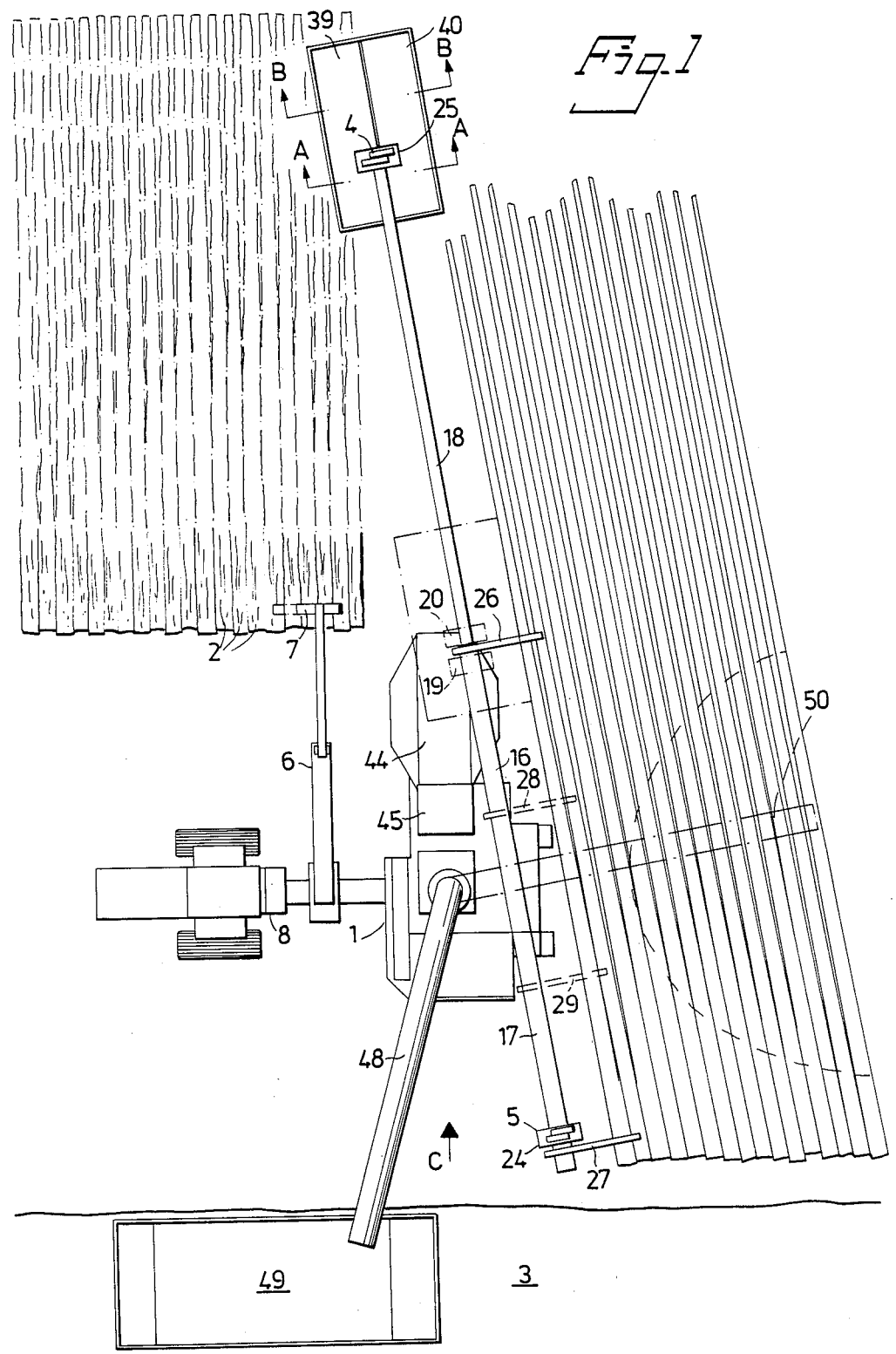

United States Patent [19]
Jörgensen et al.

[11] Patent Number: 4,574,855
[45] Date of Patent: Mar. 11, 1986

[54] TREE PROCESSING MACHINE

[75] Inventors: Karl-Gunnar Jörgensen, Sollentuna; Leif Magnusson, Järfälla, both of Sweden

[73] Assignee: Teknikgruppen AB, Sollentuna, Sweden

[21] Appl. No.: 599,793

[22] Filed: Apr. 13, 1984

[30] Foreign Application Priority Data

Apr. 15, 1983 [SE] Sweden ................ 8302122

[51] Int. Cl.⁴ .............................. B27L 1/00
[52] U.S. Cl. ..................... 144/2 Z; 144/343
[58] Field of Search .............. 144/3 D, 2 Z, 343

[56] References Cited

U.S. PATENT DOCUMENTS

| | | | |
|---|---|---|---|
| 3,987,826 | 10/1976 | McKenzie | 144/2 Z |
| 4,130,151 | 12/1978 | Ericsson | 144/2 Z |
| 4,382,457 | 5/1983 | Hahn | 144/2 Z |
| 4,416,311 | 11/1983 | Gemmell-Murdoch | 144/2 Z |

FOREIGN PATENT DOCUMENTS

| | | | |
|---|---|---|---|
| 406512 | 7/1974 | U.S.S.R. | 144/2 Z |
| 425792 | 10/1974 | U.S.S.R. | 144/2 Z |

Primary Examiner—W. D. Bray
Attorney, Agent, or Firm—LeBlanc, Nolan, Shur & Nies

[57] ABSTRACT

A machine (1) for processing trees, comprises limbing tools, holding tools and a feed-in crane, where a holding tool and a limbing tool are movable relative to one another. According to the invention, the holding tool (5) and, respectively, limbing tool (4) comprise upward opening grap claws (9,10) or the like. The holding tool (5) and limbing tool (4) are movable to a first end position located close to each other, in which the tools (4,5) are in a position of receiving one tree or a bundle of trees from a separate feed-in crane. The holding tool (5) is movable in the direction from the limbing tool, and vice versa, to a second end position (24,25), during which movement the tree laid-in or the bundle of trees laid-in are intended to be limbed. The machine (1) is provided with two or more unloading arms (31), which are located along a limbing path defined by the movement of the tools (4,5), which arms (31) in a first position (28) where they serve as carrying arms are located below the level of the tools (5) and are pivotal from the first position (28) to a second position (30) where they are located above the level of the tools (5) in order by means of the pivotal movement to lift limbed trees and move them laterally to a stem stack.

8 Claims, 5 Drawing Figures

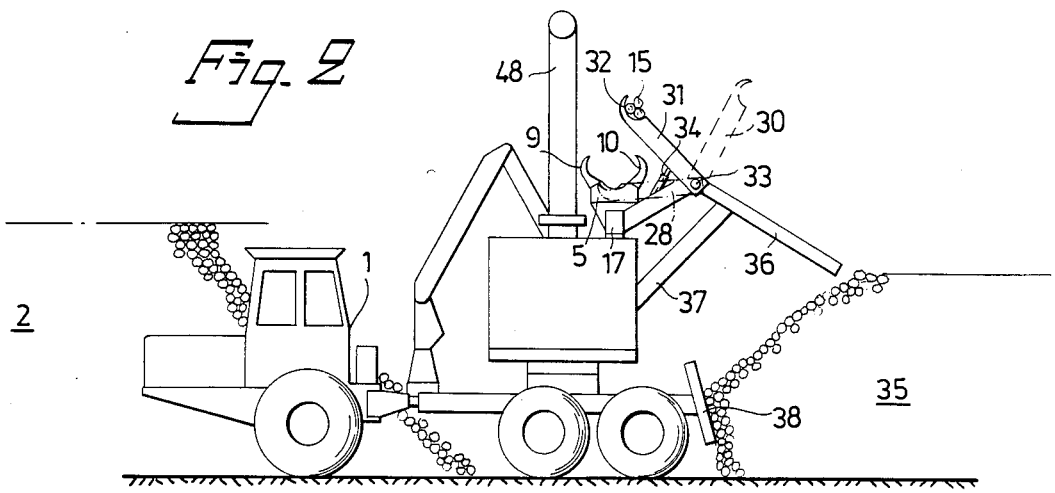
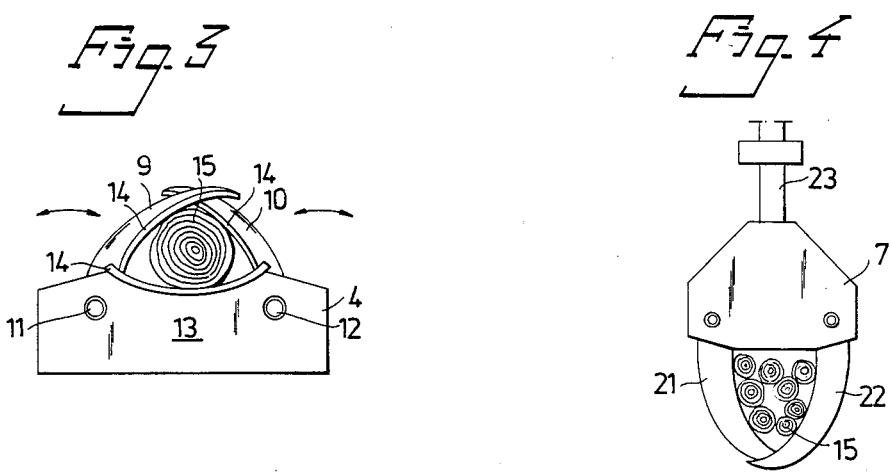
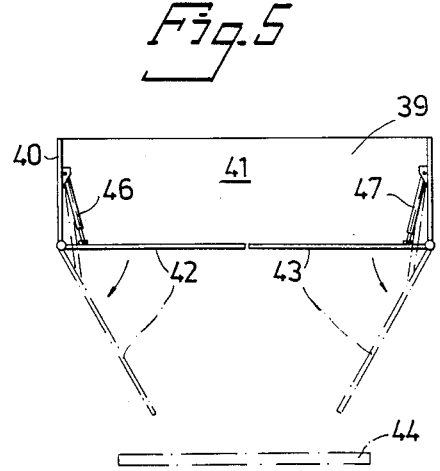

TREE PROCESSING MACHINE

This invention relates to a machine for the processing of trees.

The invention, more precisely, relates to a mobile machine for processing trees primarily by limbing on landings at a motorway.

Tree processing machines, which are mobile and intended for use on landings in connection to a motorway, are known previously.

Such machines are provided with limbing tools of various types. According to one type, the limbing device is located on the machine, and the trees are laid on a processing path by means of a feed-in crane provided with grapple or felling members.

According to another type, the limbing device is suspended at the top of the feed-in crane. The device is placed on a lying tree, which thereby is caught by the grap claw of the limbing device to be fed-in between drive rollers capable to drive the tree relative to the stationary limbing device.

One alternative to the use of drive rollers is to utilize stepped feed by means of a telescopically operating boom. A tree is caught by the limbing device on the ground and lifted by the device to a position where a holding device is located. The limbing device thereafter is moved while the tree is secured by the holding device. According to this type, the grapple members of the limbing device and holding device open downward.

A telescopic arm, which comprises a main arm and a travelling arm movable relative to the main arm, which travelling arm is provided at its outer end with a limbing tool, can be provided with a holding tool movable along the main arm. Such a design is comprised in the present invention and yields a very high limbing capacity, because the limbing and the holding tool simultaneously move away from each other at the limbing operation.

In known arrangements, the capacity is limited primarily because one of the tools is used for catching trees from a stack.

A grapple member suitable for catching one tree from a stack of trees must be designed in a different way and be easier to operate than said telescopic arm and associated tool for being able to simply and rapidly catch a tree. This is particularly obvious at so-called bundle limbing where a bundle of, for example, five to six small trees are to be caught simultaneously from a stack.

In known machines of this type a further problem arises. Due to the fact that the tools open downward, the telescopic arm is required to be swung outward over a stack of stems in order there to release downward a limbed tree. For this reason, furthermore, the height of the stem stack is limited, viz. to that height above the ground at which the tools can position a limbed tree.

At bundle limbing another problem arises at known machines of this type. The small trees often can have very varying lengths, which implies that only the holding tool embraces all trees when the limbing tool limbs the top end of the longest tree. The shorter trees then have a tendency of being deflected downward, and at the same time the release of the limbed bundle to the stem stack is rendered more difficult.

The present invention relates to a machine of the type provided with a telescopic arm, where all the aforesaid shortcomings are eliminated, and where a high capacity is achieved.

The present invention, thus, relates to a machine for processing trees, comprising limbing tools, holding tools and a feed-in crane, where a holding tool and a limbing tool are arranged movable relative to each other. The invention is characterized in that the holding tool and, respectively, limbing tool comprise upward opening grappling claws or the like, that the holding and the limbing tool are movable to a first end position located close to each other, at which end position the tools are in the position for receiving a tree or a bundle of trees from a separate feed-in crane, that the holding tool is movable in the direction from the limbing tool, and vice versa, to a second end position, during which movement the tree or bundle of trees laid-in are intended to be limbed, and that two or more unloading arms are located along a limbing path defined by the movement of the tools, which unloading arms in a first position where they serve as carrying arms are located below the level of the tools, and which arms are pivotal from said first position to a second position where they are located above the level of the tools, in order by the pivotal movement to lift limbed trees and to move them laterally to a stem stack.

According to the present invention, a device with limbing tool and holding tool mounted on a telescopic arm is utilized, which arm is provided with trees by means of a separate feed-in crane. By using a separate feed-in crane capable to catch a tree or a bundle of trees from a tree stack, the limbing path can operate at the same time as the feed-in crane catches the next tree.

According to the invention, the tools comprise grapple claws or the like which open upward. Such a design renders it possible to rapidly and easily place trees or bundles of trees into the tools. A very important advantage of this design is that limbed trees can be lifted upward from the tools, which in its turn implies that high stem stacks can be built up.

For being able to build up high stem stacks, and in order only to use the telescopically operating arm for limbing, according to the present invention the machine is provided with unloading arms, which in one position serve as carrying arms for trees being limbed, and which by a pivotal movement lift limbed stems and move them laterally to the stem stack. At the pivotal movement the carrying arms, depending on their design, can lift limbed stems to a level substantially exceeding the level of the tools. According to a preferred embodiment, more than two unloading arms are provided, which are located so as to carry trees having a length shorter than the longest distance between the tools at the limbing of bundles. This design, thus, renders it possible that trees of very varying length can be comprised in a bundle to be limbed.

A machine according to the present invention, thus, has a high capacity at the limbing of bundles as well as of single trees and renders it possible to build up high stem stacks. High stem stacks are in many cases advantageous, and even necessary, in view of the space available.

In order to increase the total capacity of the machine, according to one embodiment the machine is provided with a limb collecting device, which is capable of collecting limbs at the limbing operation and to deliver the limbs to a chipping unit or baling unit located at the machine.

Further characterizing features are set forth in the following where the invention is described with reference to an embodiment of the invention illustrated in the accompanying drawings, in which FIG. 1 shows a machine according to the invention schematically from above and located on a landing adjacent a motorway, FIG. 2 shows the machine according to FIG. 1, seen in the direction marked by the arrow C in FIG. 1, FIG. 3 is a schematic detail view of the limbing tool after the line A—A in FIG. 1, FIG. 4 shows schematically the grapple member of the feed-in crane, FIG. 5 is a vertical section through the limb collecting device after the line B—B in FIG. 1.

In FIG. 1 a machine 1 according to the invention for processing trees 2 is shown which have been forwarded to a landing at a motorway 3.

The processing machine 1 comprises a limbing tool 4 and a holding tool 5. The machine 1 further comprises a separate feed-in crane 6 with associated grapple member 7. The machine also comprises a mobile vehicle 8, which as at the embodiment shown can be a vehicle with articulated frame steering.

FIG. 3 is a schematic detail view of a limbing tool 4. It comprises grappling claws 9–10, which are movable outward and inward and, thus, can be rotated about pivot members 11–12 by power transmitting means, such as hydraulic cylinders (not shown). The inward facing side of the grappling claws 9–10 and the stationary portion 13 of the tool are provided with knives 14, which at relative movement between the grappling claws and one or several trees 15 limb the tree. When one or several trees are being laid in a limbing tool, the grappling claws are swung outward so that an upward opening grapple jaw is formed by the two grappling claws. After a tree 15 has been laid in, the grappling claws are moved to a position embracing the tree or trees, as shown in FIG. 3, with a force suitably adapted to limb the trees without causing them to cling to the claws.

The holding tool 5 preferably is designed in the same way as the limbing tool 4, with the only exception that the knives 14 are provided with projecting spikes or the like in order thereby to obtain a firm grip on the tree.

A telescopic arm 16 is hingedly suspended relative to the vehicle 8, in such a manner that the arm via a first hinge is pivotal in the horizontal plane and via a second hinge is pivotal in the vertical plane. The telescopic arm 16 comprises a main arm 17, which is mounted in the way described on the vehicle 8, and a travelling arm 18, which is mounted in the main arm 17 and telescopically movable relative to the same by suitable drive means, which for example can be drive cables. The limbing tool 4 is rigidly attached to the outermost end of the travelling arm 18.

The holding tool 5 is movable relative to the main arm 17 by suitable drive means.

The limbing tool 4 and holding tool 5, owing to the arrangement described, can be moved to a first end position located close to each other and marked by the numerals 19,20 in FIG. 1, where the travelling arm 18 is retracted at maximum into the main arm 17, and the holding tool 5 is moved to a first end position along the main arm 17.

The said hinged suspension of the main arm 17 is located a distance from that end of the main arm where the travelling arm 18 moves out, so that the tools 4,5 when being in their said first end position are located outside the hinged suspension in the direction to the extension direction of the travelling arm 18. This in its turn implies that the telescopic arm 16 is inclined downward in the direction to the travelling arm, which substantially facilitates the positioning of trees 15 in the tools.

The positioning of one or several trees 15 at a time is effected by the feed-in crane 6. Its grapple member 7 is shown on an enlarged scale in FIG. 4. The grapple member 7 comprises two grappling claws 21,22, which are operated by a hydraulic cylinder (not shown). The axle 23 of the grapple member 7 is attached on the boom of the feed-in crane. The axle preferably can be operated relative to the boom by means of a hydraulic cylinder or hydraulic motor.

At the lifting of one or several trees at the landing, the grap claws are lowered and thereafter caused to embrace the tree or trees. When the tools 4,5 are in their said first end position 19,20, the feed-in crane is swung in to this position and places the tree or trees in the tools, the grappling claws of which thereafter embrace the trees.

The limbing tool and, respectively, holding tool are movable from each other, as stated above.

When the trees 15 have been caught by the tools 4,5, the tools are moved in the direction from said first end position to a second end position, designated by 24,25 in FIG. 1, where the holding tool is located at that end of the main arm 17 which is farthest away from the travelling arm, and where the travelling arm 18 is extended at maximum out of the main arm.

During this movement, thus, the trees are limbed to only a small distance from the top of the trees. The tree length, of course, affects the distance, through which the tools 4,5 are moved to the second end position.

In FIG. 1 the tools are shown by fully drawn lines in the second end position. In cases when the trees are longer than the maximum distance between the tools, the holding tool 5 releases its grip about the trees whereafter it is moved through a distance to its first end position and/or the travelling arm 18 is retracted into the main arm some distance whereafter the holding tool 5 again is caused to embrace the trees. Thereafter the holding tool 5 and/or the travelling arm and therewith the limbing tool 4 are moved to their said second end position. The operation is repeated when required until the entire intended tree length is limbed.

For cross-cutting the tree tops, flying shearing tools or guide bar saws (not shown) are provided in known manner at the limbing tools.

According to the invention, unloading arms 26,27 are located along a limbing path defined by the movement of the tools 4,5, which arms are provided especially along the length of the main arm 17 as shown in FIG. 1. Additional unloading arms 28,29 shown by dash-dotted lines in FIG. 1 act as carrying arms for limbed trees or trees being limbed. In cases when certain trees are shorter than the maximum distance between the tools 4,5, these trees are supported by the unloading arm 26, while longer trees are completely limbed. In the case of bundle limbing the tree length can vary very substantially. For this reason, according to a preferred embodiment of the invention, more than two additional arms 28,29 are provided along the length of the main arm. It is also preferable to provide an unloading arm 26,27 in connection with each of the ends of the main arm 17.

The unloading arms 26–29 are located below the level of the tools 4,5 in a first position as shown by arm 28 in FIG. 2.

The unloading arms 26–29 can be swung from the first position to a second position indicated by an arm 30 shown in dashed lines in FIG. 2 where they are located above the level of the tools.

Each of the unloading arms comprises an arm 31, see FIG. 2, with a recess 32 for trees 15. Each of the arms is pivotal about a journal 33 by means of a hydraulic cylinder 34. The journal 33 in FIG. 2 are located on the right-hand side of the main arm, which implies that upon opening of the tools 4,5 and pivotal movement of the unloading arms from position 28 to position 30 by means of the cylinder 34 the trees 15 are lifted and moved laterally whereby they are tipped off to a stem stack 35 behind the machine 1.

According to a preferred embodiment of the invention a chute 36 is provided to the side of the main arm 17. Limbed trees tipped off from the unloading arms are intended to slide to the stem stack 35 along the chute. The chute 36 preferably is located substantially from the axes of journals 33 of the unloading arms to extend obliquely downward/outward from the machine. The chute 36 is supported on rods 37. The chute 36 can consist of metal sheet or a number of beams arranged in parallel with each other.

Owing to the unloading arms 26–29 and chute 36, a much higher stem stack 35 can be built up than known machines would permit. A high stem stack, as mentioned, often is very advantageous.

In order to additionally facilitate the build-up of a high stem stack, and for minimizing the risk that a collapse of the stem stack against the machine renders the movements of the machine more difficult, a supporting device 38 is rigidly mounted on the rear part of the machine. The supporting device 38 preferably consists of a plurality of mutually parallel beams. As appears from FIG. 2, the supporting device limits the spread of the stem stack 35 in horizontal direction relative to the machine 1.

The present invention is especially advantageous at bundle limbing, because the feed-in, limbing and tipping off of limbed stems are three separate operations, each of which can be carried out without interfering with the capacity of the two remaining operations. As at bundle limbing relatively small trees are limbed, the difference in capacity between a machine according to the invention and known machine is substantial.

After delimbing, cross-cutting of tops and tipping off of the trees, the tools 4,5 are moved to their first end position, new trees are placed in the tools, whereafter the limbing operation described above is repeated.

According to a preferred embodiment of the invention, a limb collecting device 39 is mounted at the limbing tool 4, i.e. at the outer end of the travelling arm 18. The limb collecting device comprises a box 40 with an upper opening 41, see FIG. 5, located before the limbing tools 4 in their direction of movement at ongoing limbing.

Removed limbs and branches drop down through the opening 41 and are collected in the box 40 while the box is being moved outward by means of the travelling arm 18. Also the cross-cut tops fall down into the box.

When the travel arm, after completed limbing, is retracted into the main arm and is located close to its innermost position, covers 42,43 are opened which constitute the bottom of the box 40. Limbed branches thereby drop down onto a feed-in conveyor 44, see FIG. 1, which feeds the limbs to a chipping unit 45 located at the processing machine or to a bundling unit (not shown). The position of the feed-in conveyor 44 in relation to the box 40 at the delivery of limbs is indicated by dashed lines in FIG. 5.

The covers 42,43 are operated by hydraulic cylinders 46,47 and are opened to their open position when the box 40 assumes the position corresponding to the limbing tool 4 being in its said first end position.

When a chipping unit 45 is provided, an exhaust pipe 48 for chips is mounted pivotal about a vertical axle relative to the machine.

The pipe 48 preferably has substantial length, so that chips can be blown directly, for example, into a lorry container 49 located on the motorway. When no container 49 is available for a shorter or longer period, the pipe can be pivoted to a second position designated by 50 in FIG. 1, in which position the chips are blown out over the stem stack. The chips hereby are not contaminated with soil and the like, but can be loaded clean over to containers or the like.

The present invention, thus, solves the problem referred to above in the introductory portion with the result that the machine is very efficient.

The present invention, of course, can be modified in many ways without abandoning the invention idea. The unloading arms, for example, can be designed and located in a different way, and also the design of the tools and telescopic arm can be changed without thereby changing their function.

More arms can be attached to the side of each other, or more tools can be attached on one arm in order thereby increase the capacity.

The invention, thus, must not be regarded restricted to the embodiment set forth above, but can be varied within the scope of the attached claims.

We claim:

1. A machine for processing trees, comprising limbing tools, holding tools and a feed-in crane, where one holding tool and one limbing tool are mounted for movement relative to each other, wherein said holding tool and said limbing tool each comprise upward opening grappling claw means; elongate support means mounting the holding tool and the limbing tool for movement along a path defining a limbing path between a first end position whereat said holding and limbing tools are located close to each other, in which first position the tools are disposed for receiving at least one tree from a separate feed-in crane; said elongate support means which mounts said holding and limbing tools providing means enabling movement of both of said holding tool from said first position to spaced apart second end positions of each of said tools and back to said first position, movement of said tools away from each other resulting in that said at least one tree received in said tools when at said first end position, will be limbed; at least two unloading arms are mounted on said support means spaced apart along said limbing path defined by the movement of the tools, and means, which mount said unloading arms on said support means, enable pivotal movement between a first position, located below the level of the tools, where they serve as limbed tree carrying arms, and to a second position where said unloading arms are located above the level of said tools in order, by means of said pivotal movement, to lift limbed trees and move them laterally to a stem stack.

2. A machine as defined in claim 1, wherein said elongate support means is a lateral main beam with two ends and a second travelling beam carrying by, extendable from one end of and aligned with said main beam, and mounted for movement relative to and in alignment with said main beam; and said means which enable movement of both said holding tool and said limbing tool include means mounting said holding tool for movement along said main beam between its two ends and means mounting said limbing tool on said travelling beam.

3. A machine as defined in claim 2, wherein: a tree top and limb material processing unit, e.g., a chipper or bailer, is located on said machine; a conveyor means is located under said first end position on said support means for feeding tree top and limb material to said processing unit; and a limb collecting device is mounted with the limbing tool on said travelling arm and includes an opening under said limbing tool to collect limbs and tree tops during the limbing of trees, said collecting device having means, when in said first end position, to deliver collected material to said feed-in conveyor.

4. A machine as defined in claim 2, characterized in that an unloading arm (26,27) is mounted adjacent each of the ends of the main beam.

5. A machine as defined in claim 1, characterized in that at least one additional unloading arms (28,29) are located along the length of the support means.

6. A machine as defined in claim 1, characterized in that a chute (36) is located to the side of said support means, along which chute stems delivered from unloading arms (26-29) are intended to slide to the stem stack.

7. A machine as defined in claim 6, characterized in that a support device (38) in the form of a plurality of mutually parallel beams is rigidly mounted on the machine, against which supporting device (38) the stem stack is intended to be limited in the horizontal direction.

8. A machine as defined in claim 2, characterized in that the main arm (17) is pivotal about a vertical axle located a distance from that end of the main beam where the travelling arm (18) extends, so that tools (4,5) when being in their said first end position (19,20) are located between the position for the vertical axle and said end of the main beam (17).

* * * * *